US011958174B2

(12) United States Patent
Vela

(10) Patent No.: US 11,958,174 B2
(45) Date of Patent: Apr. 16, 2024

(54) VALVE SEAT PULLER HEAD ASSEMBLY

(71) Applicant: John Vela, Victoria, TX (US)

(72) Inventor: John Vela, Victoria, TX (US)

( * ) Notice: Subject to any disclaimer, the term of this patent is extended or adjusted under 35 U.S.C. 154(b) by 235 days.

(21) Appl. No.: 17/729,591

(22) Filed: Apr. 26, 2022

(65) Prior Publication Data

US 2022/0339765 A1 Oct. 27, 2022

Related U.S. Application Data

(60) Provisional application No. 63/179,623, filed on Apr. 26, 2021.

(51) Int. Cl.
*B25B 27/24* (2006.01)

(52) U.S. Cl.
CPC .................................... *B25B 27/24* (2013.01)

(58) Field of Classification Search
CPC ....... B25B 27/24; B25B 27/06; B25B 27/062; B25B 27/023
See application file for complete search history.

(56) References Cited

U.S. PATENT DOCUMENTS 6,050,766 A 4/2000 Kies et al.
6,227,225 B1 * 5/2001 Domingue .............. F16K 43/00 417/454
10,265,839 B1 * 4/2019 Hunter .................. B25B 27/026
2011/0173814 A1 * 7/2011 Patel ................... F04B 53/1087 29/890.121
2015/0283689 A1 * 10/2015 Weaver ................. B25B 27/062 29/890.121
2018/0281128 A1 * 10/2018 Rasmussen ........... B25B 27/062

FOREIGN PATENT DOCUMENTS

CN 209579426 U 11/2019

* cited by examiner

*Primary Examiner* — Seahee Hong

(74) *Attorney, Agent, or Firm* — Miguel Villarreal, Jr.; Gunn, Lee & Cave, P.C.

(57) ABSTRACT

A valve seat puller head assembly is comprised of seat puller head halves and springs. The seat puller head halves come together forming an opening. A pair of spring clips hold and secure the seat puller head halves together providing the outward force required to pre-position the tool (i.e., seat valve puller head assembly) in proper area for valve seat removal. In one embodiment, the valve seat puller head assembly further comprises an allthread having a tapered buttress engaged with the valve seat puller head via the opening of the valve seat puller head, eliminating thread clearance there between and greatly reducing the shear pressure at a root initiation area. In an alternative embodiment, a subzero temperature glycol solution within a portion of the valve seat puller head is circulated to "cold pull" heat from the valve seat puller head assembly and the valve seat which is in contact therewith.

10 Claims, 19 Drawing Sheets

VALVE SEAT PULLER HEAD ASSEMBLY

CROSS-REFERENCES TO RELATED APPLICATIONS

This original non-provisional application claims priority to and the benefit of U.S. provisional application Ser. No. 63/179,623, filed Apr. 26, 2021, and entitled "Valve Seat Puller Head Assembly," which is incorporated by reference herein.

STATEMENT REGARDING FEDERALLY-SPONSORED RESEARCH OR DEVELOPMENT

Not applicable.

BACKGROUND

1. Field of the Invention

The present invention relates to pump systems. More specifically, the invention relates to valves and seats used in mud pump and frac pump systems and a method for replacement of same during field operations.

2. Description of the Related Art

Mud pump and frac pump systems utilize valves and seats similar to any normal piston pump. These pumps are generally pumping an abrasive fluid. As such, the valves and seats must be replaced ("pulled") often to maintain proper system pressure. The replacement of the valve seats can be a safety hazard for the maintenance personnel. Most mud pump and frac pump maintenance is performed in the field utilizing hand tools. These hand tools can fail causing other system components to become projectiles and creating dangerous and even deadly environments.

There exist seat pullers in the prior art. Referring now to FIG. 1, conventional seat puller head 10 is comprised of six components. These include seat puller head halves 12 and 13 having threading 15 on the interior surfaces facing each other, only one side of which is shown in FIG. 1. Ears or flanges 19 and 21 extend distally from bottom ends 23 and 25 of seat puller head halves 12 and 13, respectively. Seat puller head halves come together forming opening 17. Conventional seat puller head 10 further includes plurality of pivot pins 14, retaining ring 18 and garter spring 16. In sum then, there are two (2) seat puller head halves; two (2) pivot pins; one (1) retaining ring, and one (1) garter spring. Welding is required to complete the assembly. However, welding is cost prohibitive and time consuming.

The most commonly used method to replace a valve seat is a tension system that uses a seat puller head, a threaded rod (commonly known as an "allthread"), a hydraulic piston and an allthread nut. The hydraulic piston applies a force to the nut pulling the allthread. The allthread loads the seat puller head. The seat puller head then applies a force to the valve seat lifting the valve seat from its (valve seat) position inside the pump. The seat puller head is the component that most often fails. The failures often initiate at the ear area of the seat puller head. The failures can also initiate at the thread root of the seat puller head.

Such existing conventional seat pullers utilize a system that introduces clearances between system components, and more specifically, clearance between the seat puller head and the allthread. This clearance allows the two sides of the seat puller head to slide inward. This inward sliding moves the load point on the puller head ear. As the load point slides to the outside diameter of the seat puller head ear area, this increases the moment of force on one of the primary failure areas exponentially. This larger moment force greatly reduces the fatigue life of the seat puller head resulting in premature failure. Another area of failure includes the partial or complete separation of the seat puller head halves.

There is a need for a seat puller head that can increase the safety and minimize the danger surrounding the replacement of valve seats and reduces the number of mechanical components in the seat puller head. There is also a further need to eliminate or reduce the need to weld components together thereby minimizing manufacturing time, which in turn, has an economic benefit (e.g., cost savings) and additional safety advantages. There is a further need for a seat puller head that reduce clearance between system components, thereby increasing the fatigue life of a seat puller head. There is also a further need for a seat puller head to resist partial or complete separation during use, thereby further reducing or minimizing hazardous conditions encountered (or created) during operation. The present invention provides a valve seat puller head that addresses the shortcomings of the prior art.

BRIEF SUMMARY OF THE INVENTION

The present invention is an improvement over the prior art. The valve seat puller head of the present invention is comprised of two (2) seat puller head halves and two (2) springs. More particularly, the present invention is comprised of a pair of seat puller head halves having threads on the interior surfaces of the halves, each facing the other. The seat puller head halves come together forming an opening. A pair of spring clips (sometimes also called "clip springs") are clipped in place within a spring slot where the two seat puller head halves join together. The spring clips hold and secure the seat puller head halves together.

The clip springs hold the seat puller head halves of the seat valve puller head together to form such a cylindrical shape to facilitate the inserting of same into the cylindrically configured valve seat inside the mud or frac pump. The clip springs also provide the outward force required to pre-position the tool (i.e., seat valve puller head assembly) in proper area for valve seat removal and further provide a greater spring force than conventional garter springs currently used in the seat puller heads. A tapered buttress thread is used to engage the valve seat puller head with the allthread and facilitates the elimination of the thread clearance between the seat puller head and the allthread and greatly reduces the shear pressure at a root initiation area thereby reducing failure at this area.

In an alternative embodiment, the present invention may include a slot in the clip spring area. The purpose of the slot is to provide an area for the clip spring to snap into position. The clip spring is inserted from the outside diameter of the seat valve puller head. In this embodiment, the clip spring includes a portion that is bent akin to a locking tab, rendering the clip spring less likely to slide out of position. Couple with clip springs on both sides of the seat puller, the assembly of the present invention does not easily come apart.

In still another embodiment, at least one pin extends distally from the surface of the seat puller head halves to "grip" the inside diameter of the valve seat to be removed.

In yet another alternative embodiment, the present invention further comprises a "cold pull" by circulating an extremely cold glycol solution within an annular ring inside of the valve seat puller head near its outside diameter. The temperature range of the extremely cold glycol solution ranges from 0 to −10° C. (or the Fahrenheit equivalent). The preferable operating low temperature, however, is approximately −5° C. The extremely low temperature cold solution pulls and removes heat from the valve seat puller head assembly and the valve seat which is in contact therewith. Alternatively, the seat puller could act as a delivery system for a cryogenic liquid reaching extremely low temperatures of −196° C.

It is an object of the present invention to increase the safety and minimize the danger surrounding the replacement of valve seats.

It is a further object of the present invention to reduce the number of mechanical components in the seat puller head.

It is still a further object of the present invention to eliminate or reduce the need to weld components together.

It is yet a further object of the present invention to reduce clearance between system components, thereby increasing the fatigue life of a seat puller head.

It is still a further object of the present invention to include a slot in the clip spring area of the seat valve puller head, rendering the clip spring less likely to slide out of position and prevent the assembly of the present invention from separating.

It is yet a further object of the present invention to include at least one pin extending distally from the surface of the seat puller head halves to "grip" the valve seat to be removed.

The terms "valve seat puller head" and "valve seat puller" are used synonymously in this application.

DETAILED DESCRIPTION OF THE INVENTION

Figure 1:
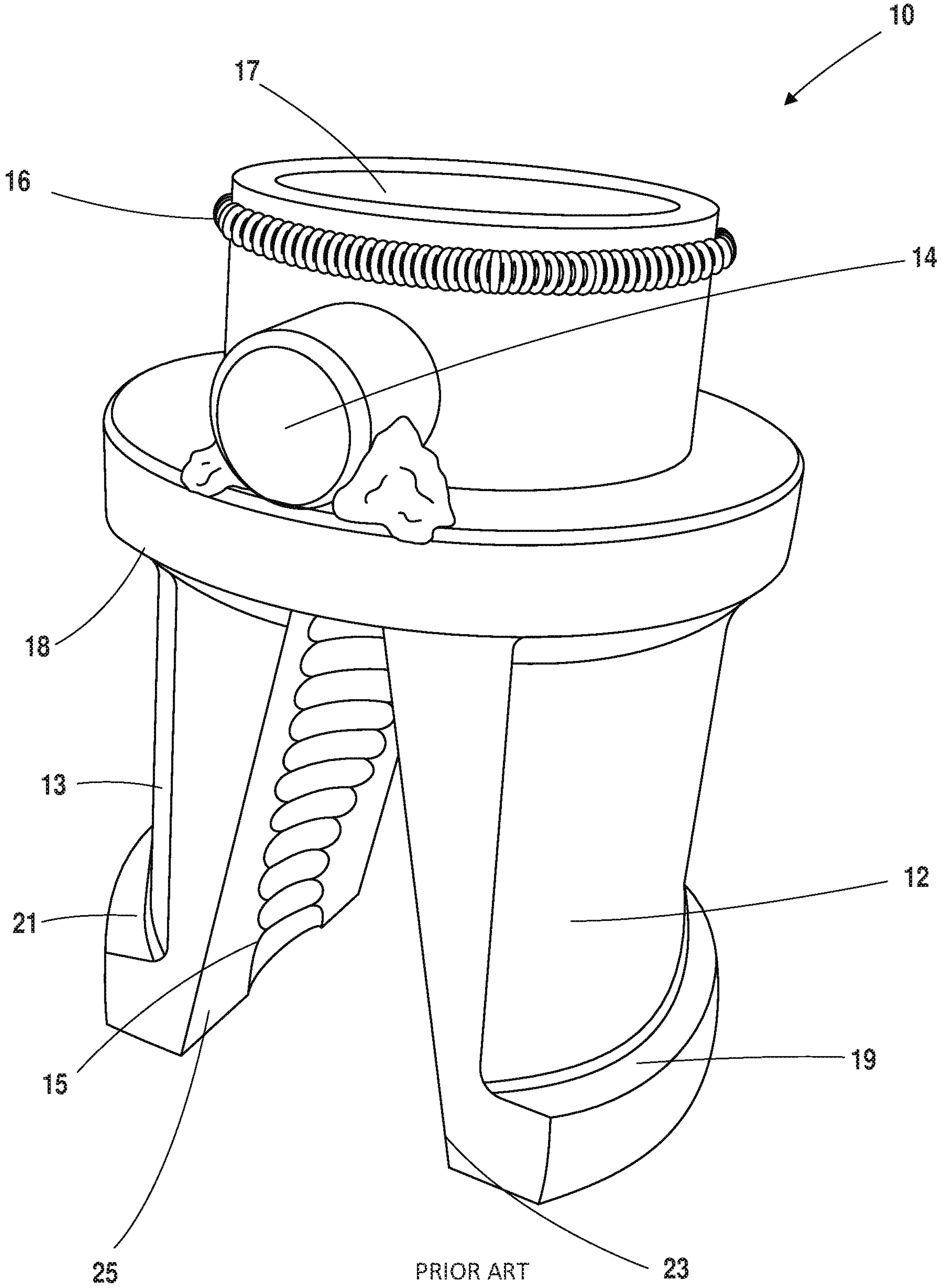
FIG. 1 is a perspective view of a conventional valve seat puller head.
Figure 2:
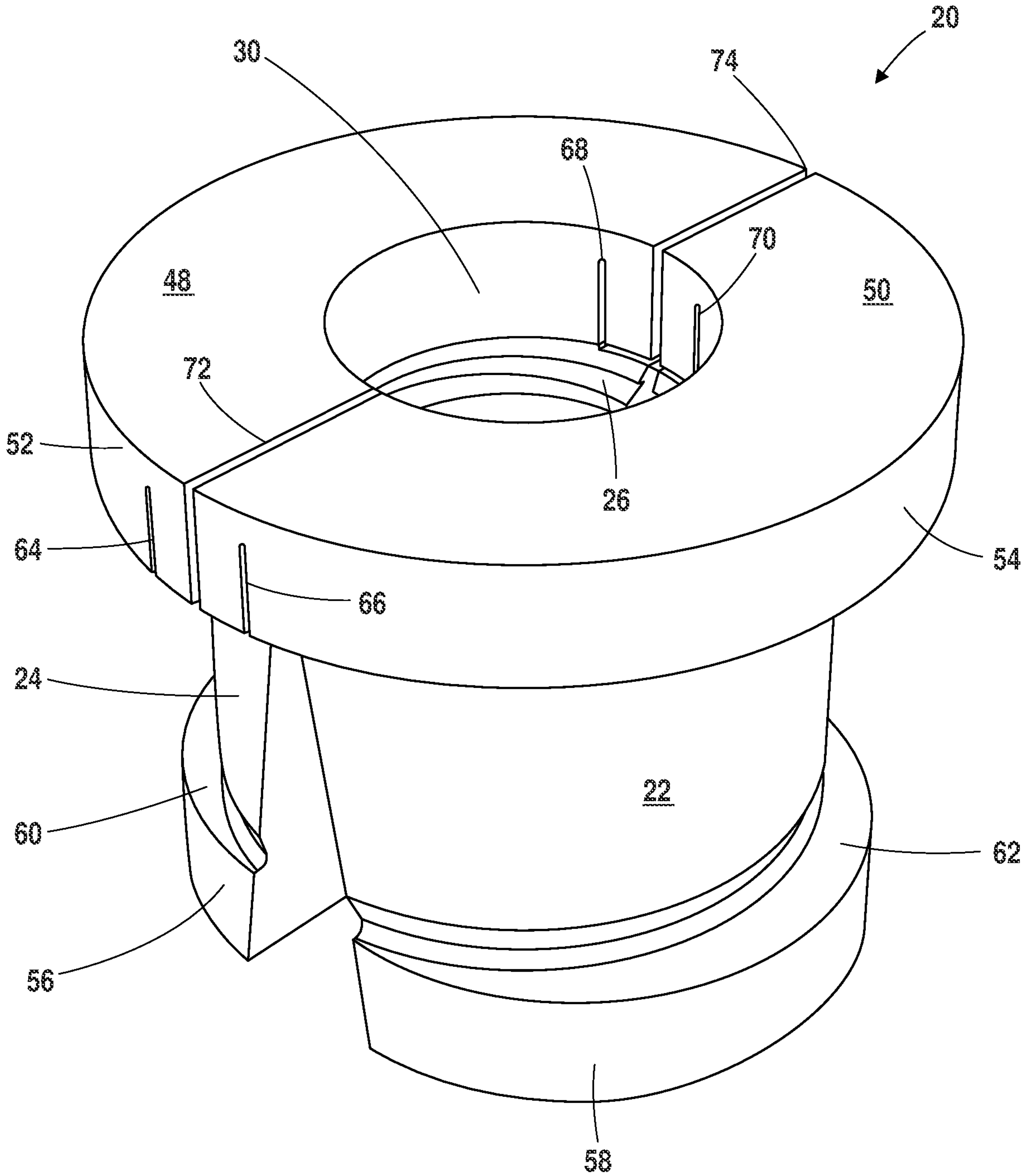
FIG. 2 is a perspective view of an embodiment of the valve seat puller head of the present invention.

Referring now to FIG. 2, valve seat puller head 20 of the present invention is shown comprised of two (2) seat puller head halves. There are no retaining ring or pins, as described with respect to FIG. 1. Instead, the present invention is comprised of seat puller head halves 22 and 24, having threads 26 on the interior surfaces facing each other, only one side of which is shown in FIG. 2. Seat puller head halves 22 and 24 come together forming opening 30. Gaps 72 and 74 form where seat puller head halves 22 and 24 come together and define an annular ring having top surface 48 and top exterior surface 52 and top surface 50 and top exterior surface 54. Seat puller head halves 22 and 24 include grooves 68 and 70, respectively, on either side of gap 74. Seat puller head halves 22 and 24 also include grooves 64 and 66, respectively, on either side of gap 72. Seat puller head halves 22 and 24 further include ears or flanges 60 and 62 and bottom exterior surfaces 56 and 58, respectively.

Figure 3:
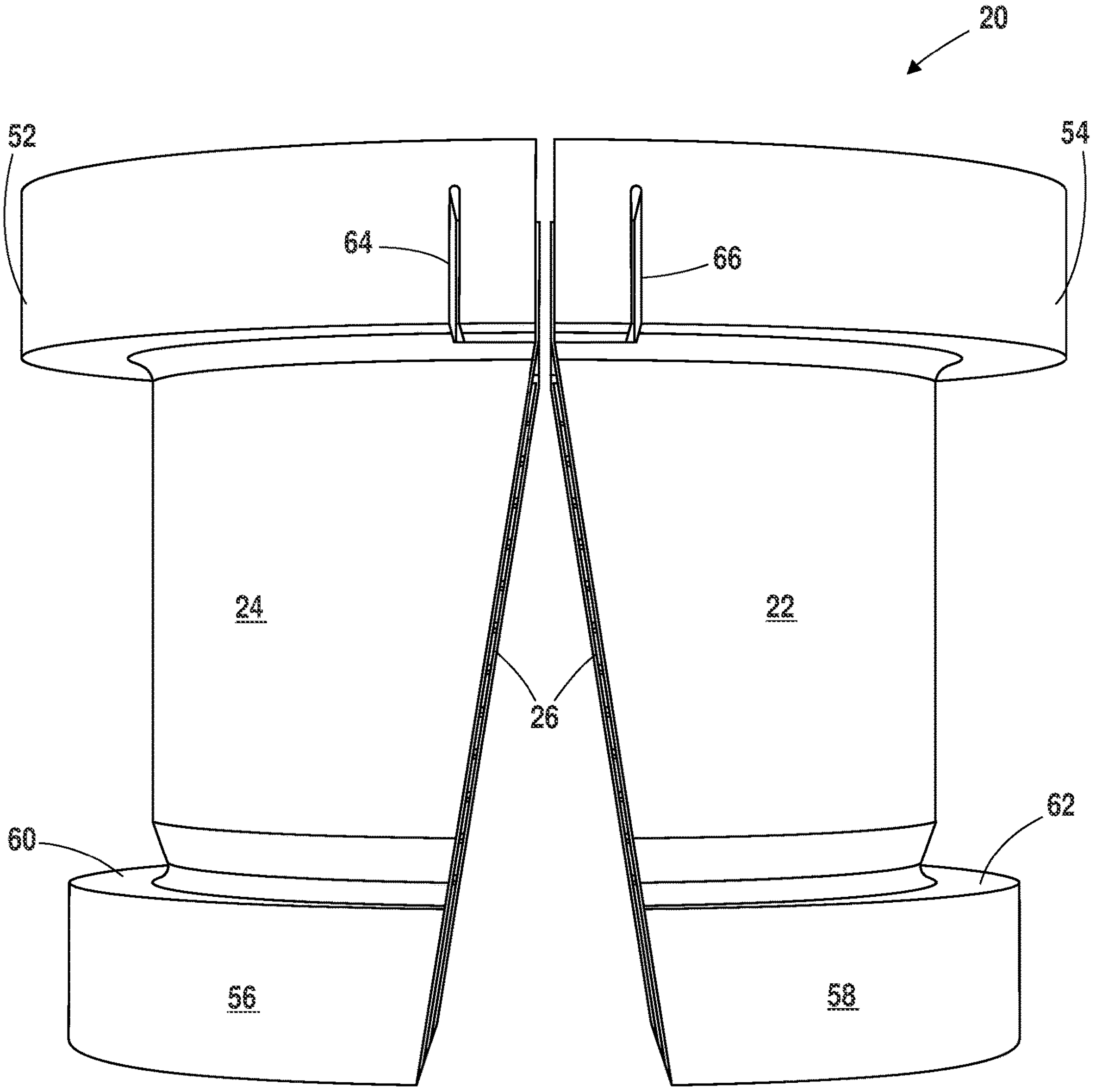
FIG. 3 is a front elevation view of an embodiment of the valve seat puller head of the present invention.
Figure 8:
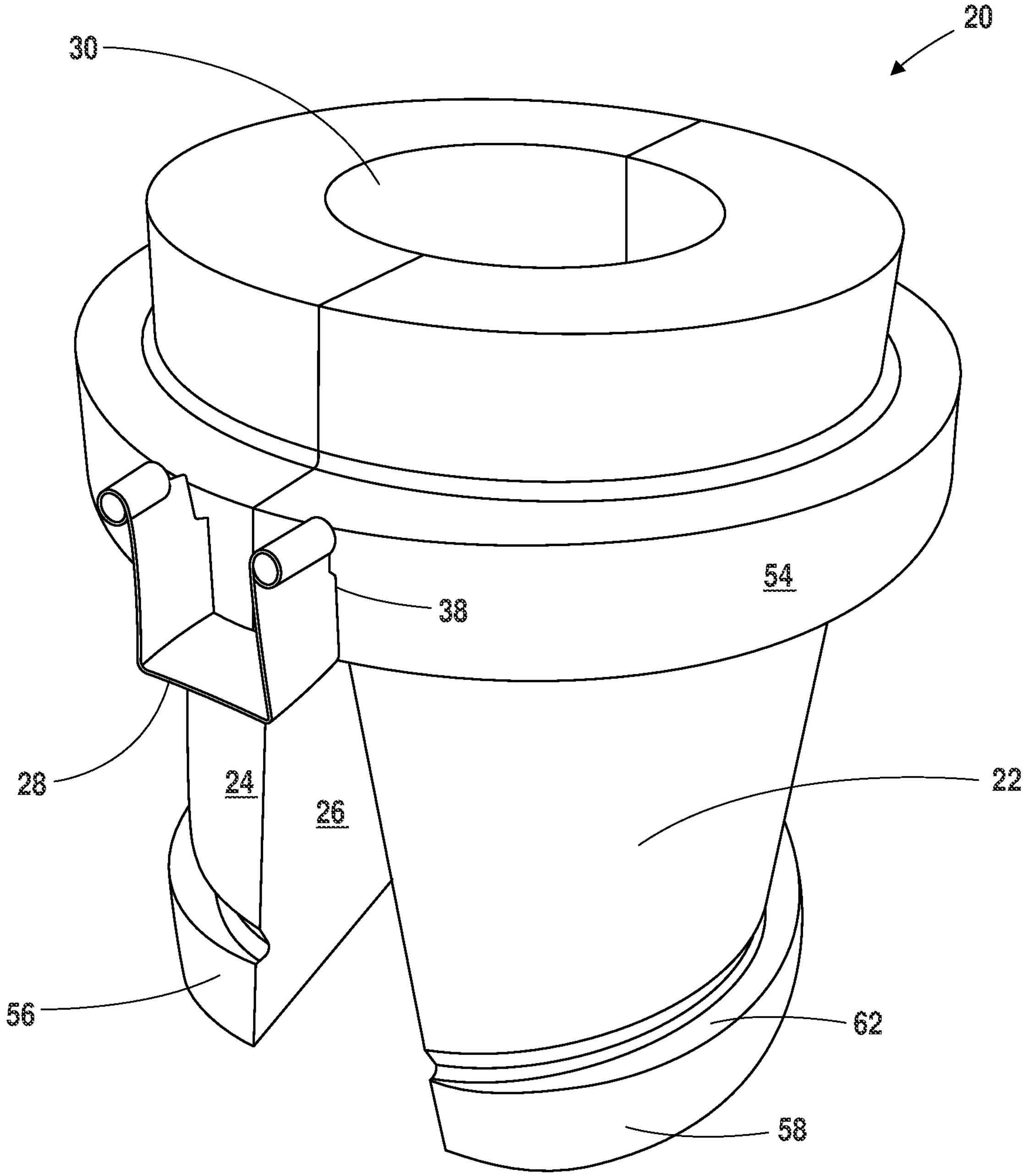
FIG. 8 is a top front perspective view of an embodiment of the valve seat puller head of the present invention.

Referring now to FIG. 3, a front elevated view of valve seat puller head 20 is shown. Top exterior surface 52 contains groove 64. top exterior surface 54 contains groove 66. The functionality of grooves 64 and 66, as referenced to FIG. 8, is explained below. Partial internal threading 26 is shown within seat puller head halves 22 and 24. The back elevated view is the mirror image of the front elevated view.

Figure 4:
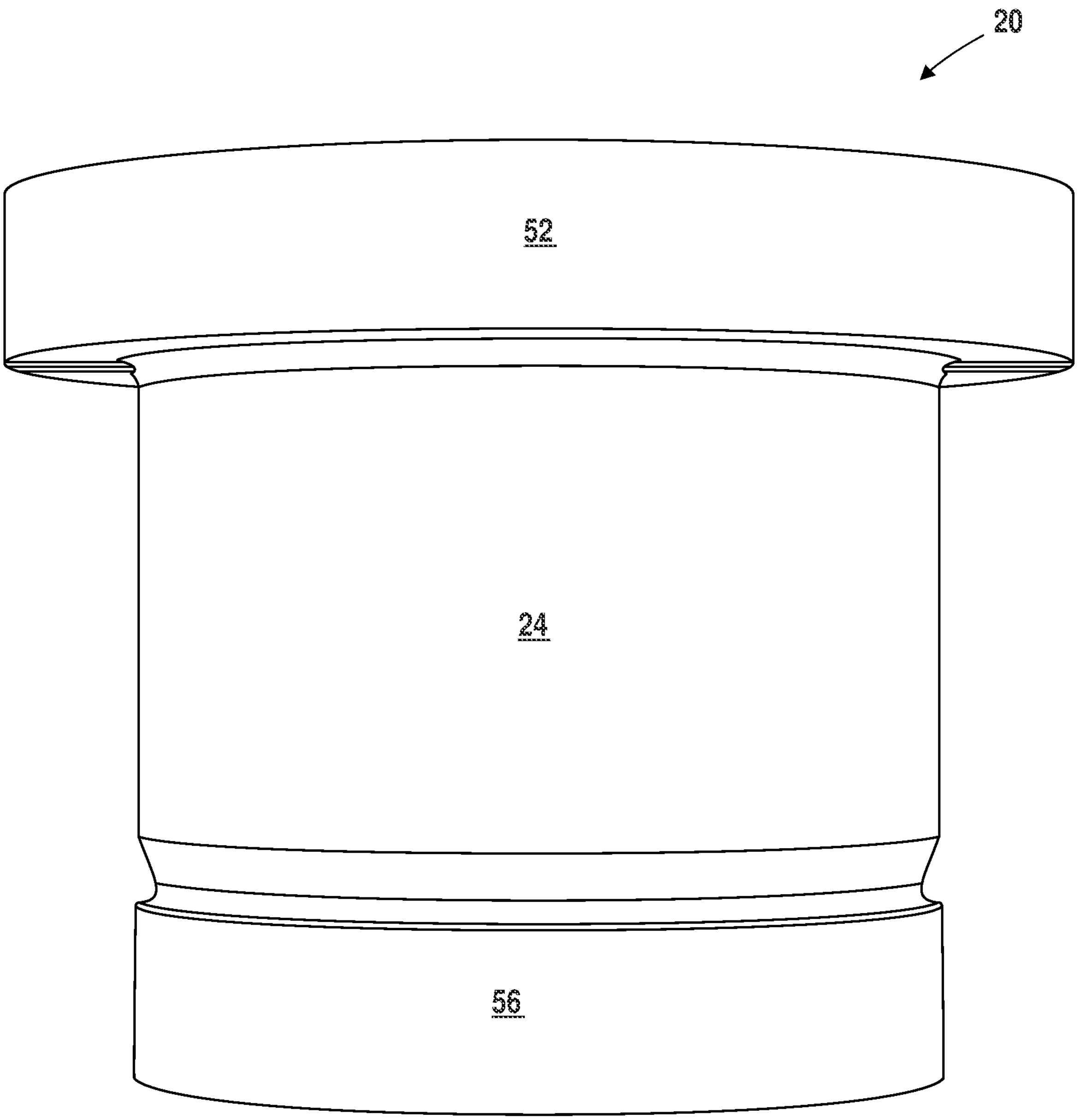
FIG. 4 is a left side elevation view of an embodiment of the valve seat puller head of the present invention.

Referring now to FIG. 4, a left elevated view of valve seat puller head 20 is shown. Only seat puller head halve 24 is shown with top exterior surface 52 and bottom exterior surface 56. The right elevated view is the mirror image of the left elevated view.

Figure 5:
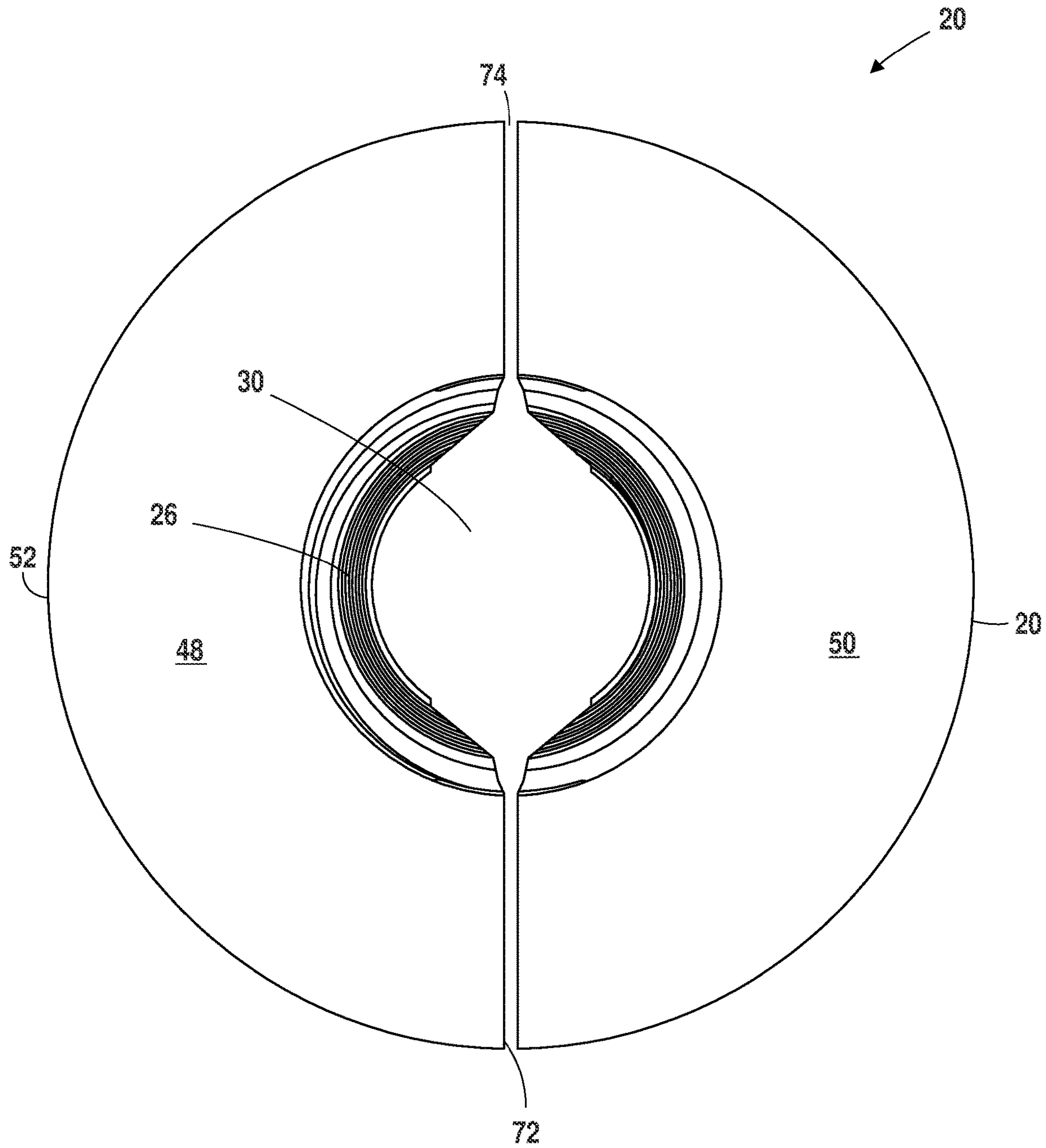
FIG. 5 is a top plan view of an embodiment of the valve seat puller head of the present invention.
Figure 6:
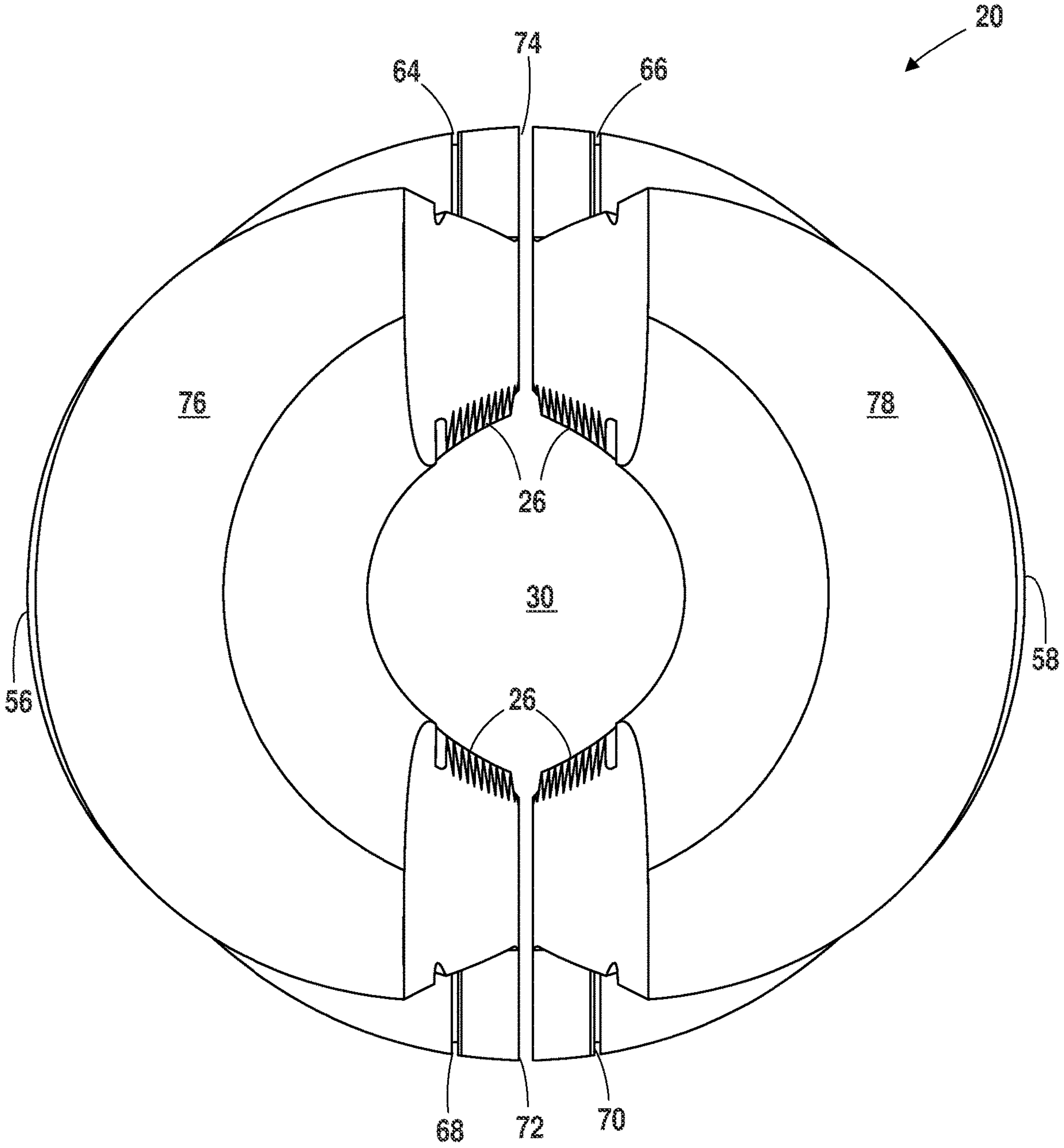
FIG. 6 is a bottom plan view of an embodiment of the valve seat puller head of the present invention.
Figure 7:
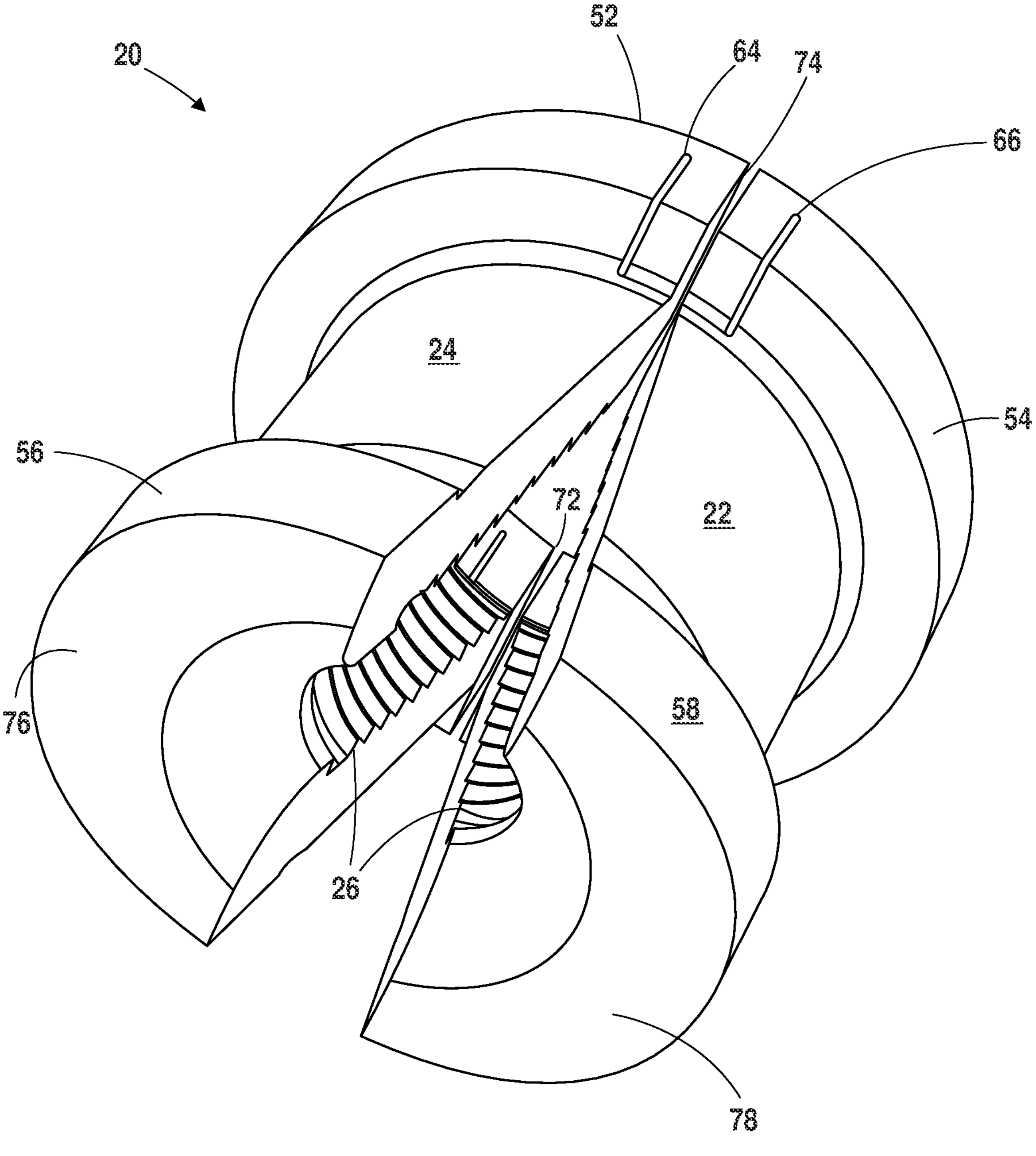
FIG. 7 is a bottom front perspective view of an embodiment of the valve seat puller head of the present invention.

Referring now to FIGS. 5 and 6, top and bottom plan views of valve seat puller head 20. Gaps 72 and 74 separate top surfaces 48 and 50 and form an annular ring defining opening 30. Grooves 64, 66, 68 and 70 are on either side of gaps 74 and 72. Threading 26 line the inside of opening 30, as shown in FIGS. 5 and 6. A perspective view of valve seat puller head 20 is shown in FIG. 7.

Referring now to FIG. 8, valve seat puller head 20 of the present invention is shown comprised of two (2) seat puller head halves and two (2) clip springs. The spring clips 28 are clipped in place within groove or spring slot 38 (later identified as groove or spring slot 66) (only one of which is shown in FIG. 8). Spring clips 28 hold seat puller head halves 22 and 24 together. In sum, valve seat puller head 20 of the present invention reduces the number of components used in conventional seat puller heads down to 4 components: two (2) seat puller head halves, and a pair of two (2) springs (i.e., spring clips).

Still referring to FIG. 8, spring clips 28 effectively eliminate the need for additional components and steps—i.e., the two pins, the retaining ring and the welding step to hold the pins and retaining ring together. This translates to fewer components that can fail, thereby lowering manufacturing time and costs and increasing safety.

Still referring to FIG. 8, clip springs 28 provide several functions. Clip springs 28 first hold valve seat puller head 20 together. The clip spring is inserted from the outside diameter of valve seat puller head 20. A cylindrical shape is required for a seat valve puller head to be efficiently inserted into the cylindrical valve seat inside the mud or frac pump. Clip springs 28 hold seat puller head halves 22 and 24 of seat valve puller head 20 together to form such a cylindrical shape. Clip springs 28 also provide the outward force required to pre-position the tool (i.e., seat valve puller head) in proper area for valve seat removal. Another advantage of clip springs 28 is that clip springs 28 provide a greater spring force than conventional garter springs currently used in the seat puller heads (See, FIG. 1).

Clip springs 28 also provide a pivot point. Seat puller head halves 22 and 24 of seat valve puller head 20 require a pivot point so that the seat puller head jaws can squeeze together for insertion into the valve seat. The pivot point was previously provided by pins 14 that were welded to retaining ring 18 on the conventional design 10 (See, FIG. 1). The pivot point pins 14 were eliminated, because spring clip 28 now provide the pivot point. In other words, instead of rotating about an axis traversing the pair of pivot pins 14 of conventional seat puller head 10, seat puller head halves 22 and 24 of valve seat puller head 20 pivot about an axis traversing clip spring 28 (and clip spring opposite clip spring 28 not shown in FIG. 8).

Figure 9:
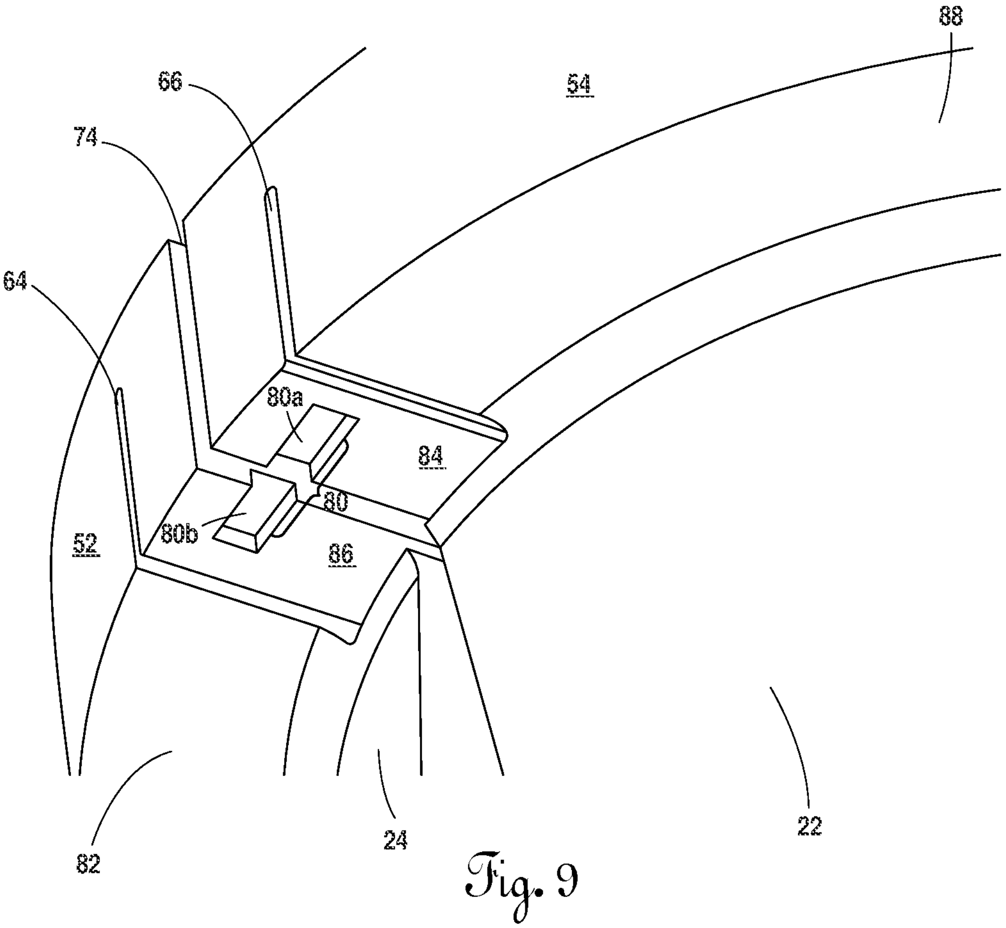
FIG. 9 is a close-up of a bottom perspective view of the clip spring area of the present invention.

In one embodiment of the present invention, and referring now to FIGS. 9-12, the body of seat valve puller head 20 includes slot 80. Slot portion **80*a* and portion 84 are on undersurface 88 of top exterior surface 54 of seat puller head halve 22. Slot portion 80*b* and portion 86 are on undersurface 82 of top exterior surface 52 of seat puller head halve 24. When seat puller head halves 22 and 24 come together, slot portions 80*a* and 80*b* define slot 80, as shown in FIG. 9. Slot 80** may be machined.

Figure 10:
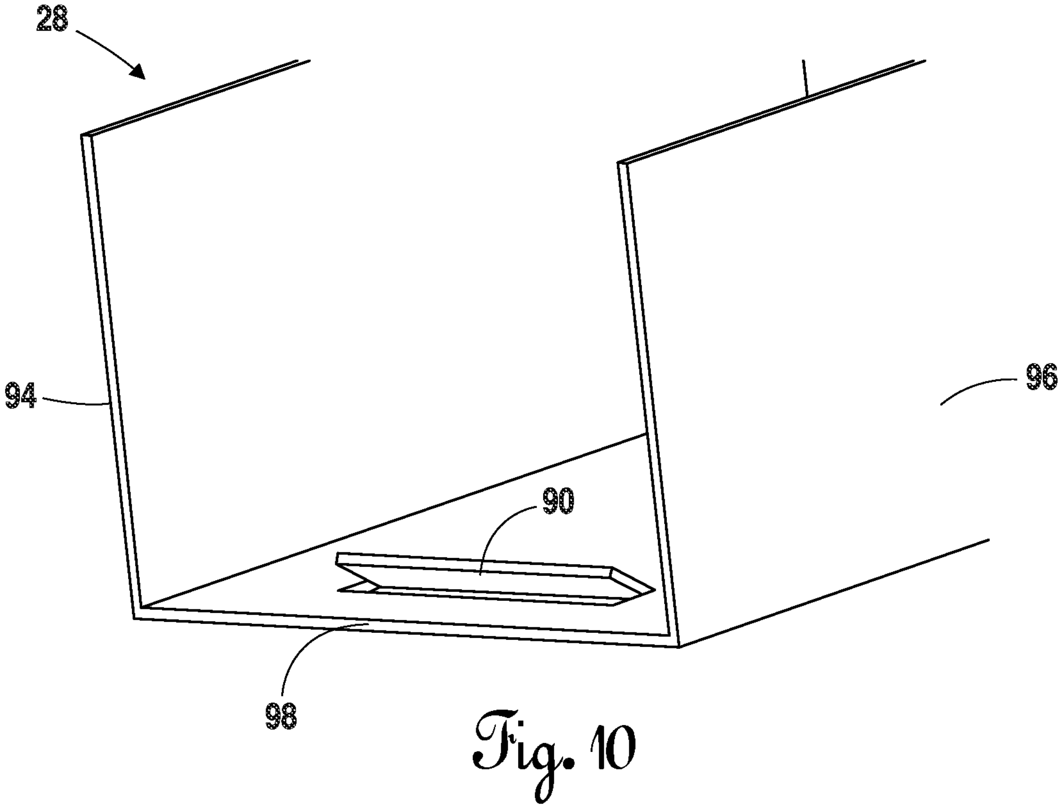
FIG. 10 is a close-up view of the clip spring of the present invention showing the locking tab therein.
Figure 11:
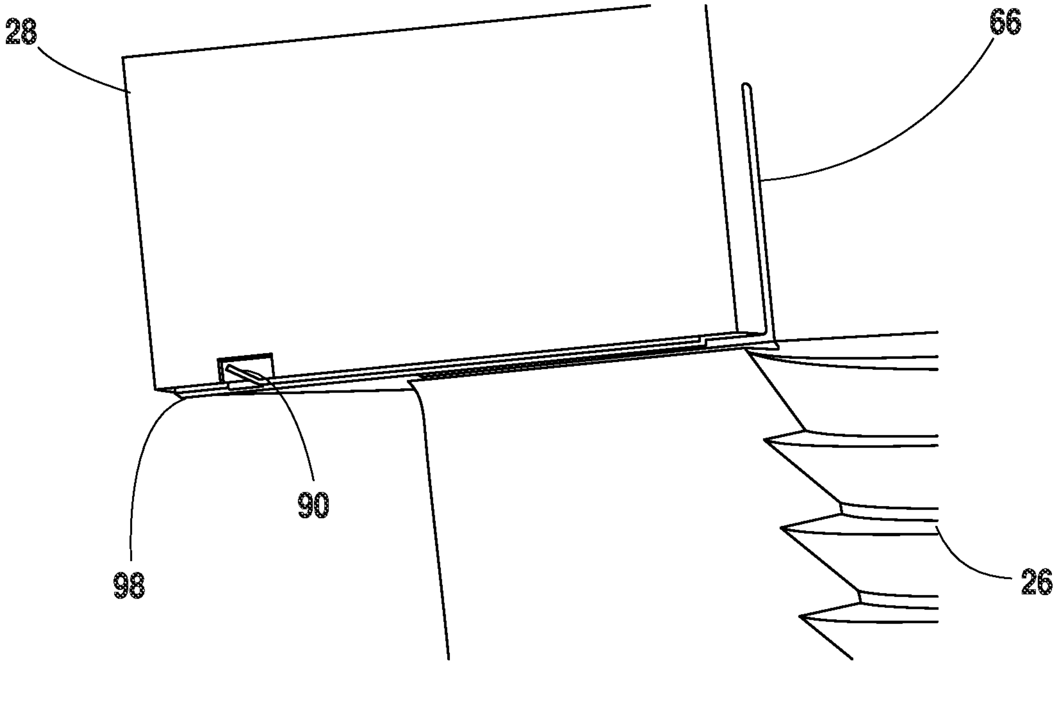
FIG. 11 is a close-up cross-sectional view of the clip spring area of the valve seat puller head of the present invention depicting the locking tab.
Figure 12:
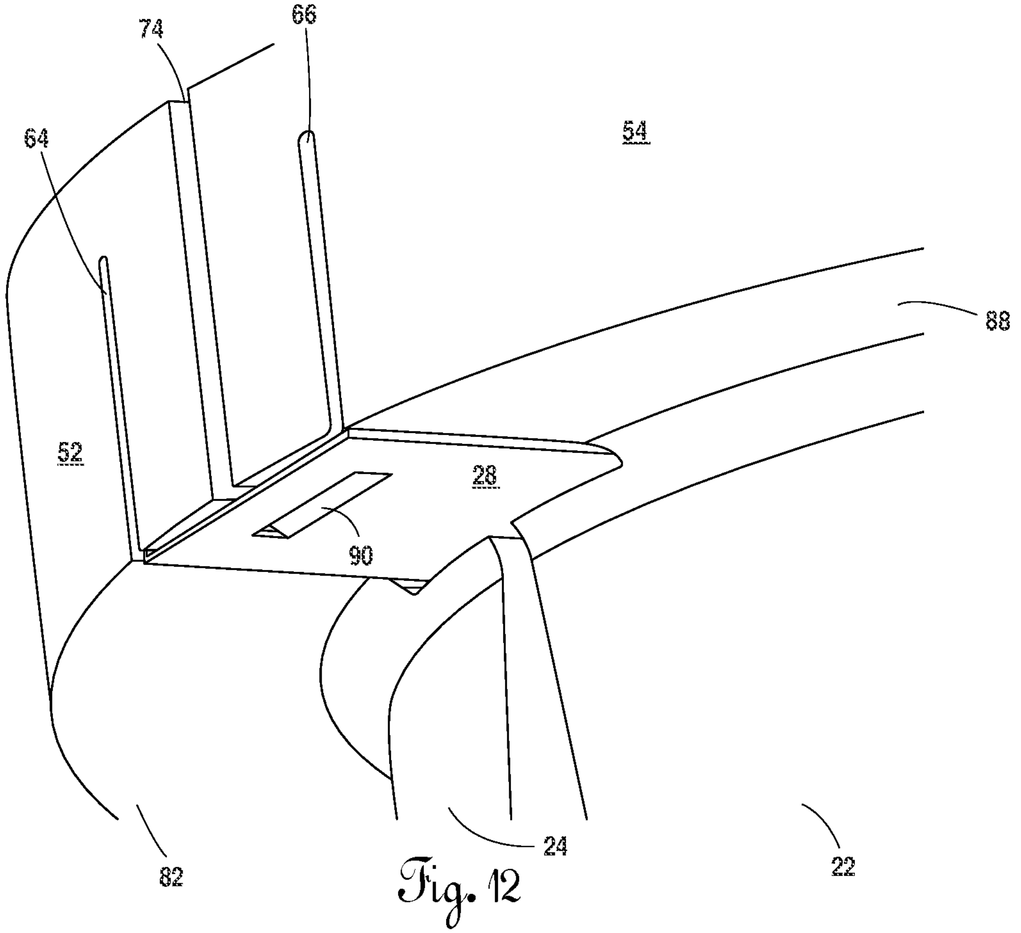
FIG. 12 is a close-up bottom perspective view of the clip area of the valve seat puller head of the present invention showing the clip spring locked in position.

The area in which machined slot 80 is located is known as the "clip spring area." The opposite side of seat puller head halves 22 and 24 is the mirror image of and also has a clip spring area. The purpose of slot 80 is to provide an area for clip spring 28 to snap into position. Clip spring 28 includes locking tab 90, as shown in FIG. 10. Locking tab 90 is within bottom surface 98 of clip spring 28. Sides 94 and 96 of clip spring 28 slide within corresponding grooves or spring slots 52 and 66. When machined slot 80 is included, clip spring 28 is less likely to slide out of position. When seat puller head halves 22 and 24 are coupled with clip springs 28 (locked into place within slot 80) on both sides, valve seat puller head 20 does not easily come apart. A cross-sectional view of the coupling of seat puller head halves 22 and 24 with clip springs 28 in the clip spring area (opposite internal threading 26) is depicted in FIG. 11. FIG. 12 shows the complete engagement between and locking of clip spring 28 using locking tab 90 with seat puller head halves 22 and 24.

Figure 13:
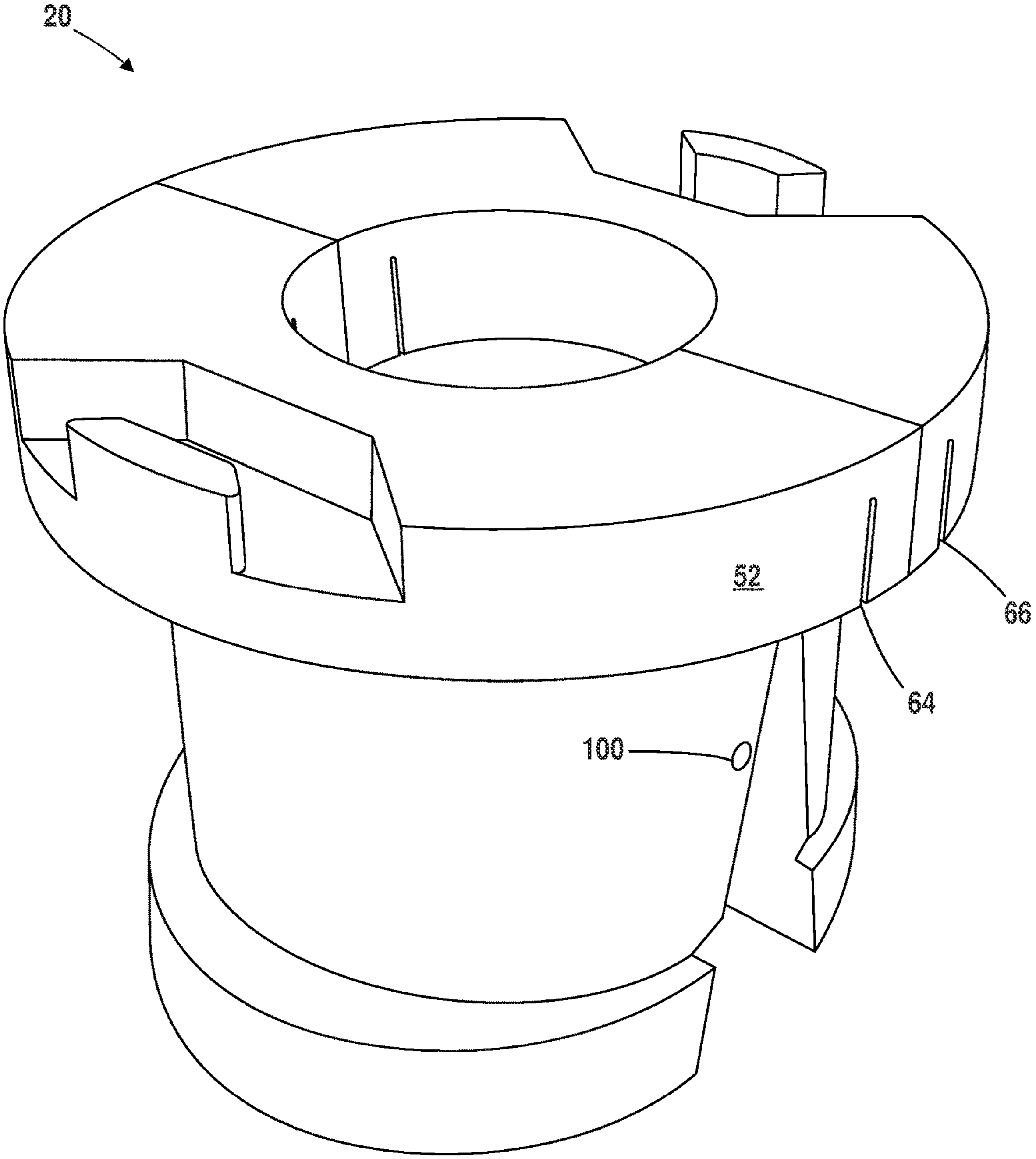
FIG. 13 is a left top perspective of an alternative embodiment of the present invention depicting a pin extending distally from the surface of the seat puller head.

Referring now to FIG. 13, an amount of clearance is introduced between the outside diameter of valve seat puller head 20 and the inside diameter of a valve seat (not shown). This diametrical clearance can range from 0.002" to 0.06". At least one hardened pin 100 is placed in the outside (i.e., outer diameter) of valve seat puller head 20 (near the edges) to "grip" the inside diameter of the valve seat (not shown). Pins 100 used in the present invention are 0.125" in diameter. The range for a pin, however, may be from 0.015" to 0.25" and still be within the contemplation of the present invention. The pins can have a range of height above the surface of the outer diameter (OD) of valve seat puller head 20 equal to half of the diametrical clearance (0.001" to 0.03"). This produces a gripping effect between valve seat puller head 20 and the targeted valve seat.

FIG. 13 illustrates the pin location on valve seat puller head 20. The quantity of the pins may be any multiple. This pin location may be at any location on the OD of valve seat puller head 20 where valve seat puller head 20 engages the valve seat. In alternative embodiments, the same effect can be achieved with a knurl or with an impingement or with any other method to raise the height of material from a machined surface. Both the knurl and impingement will have limitations as to the height that can be produced above a normal machined surface.

Figure 14:
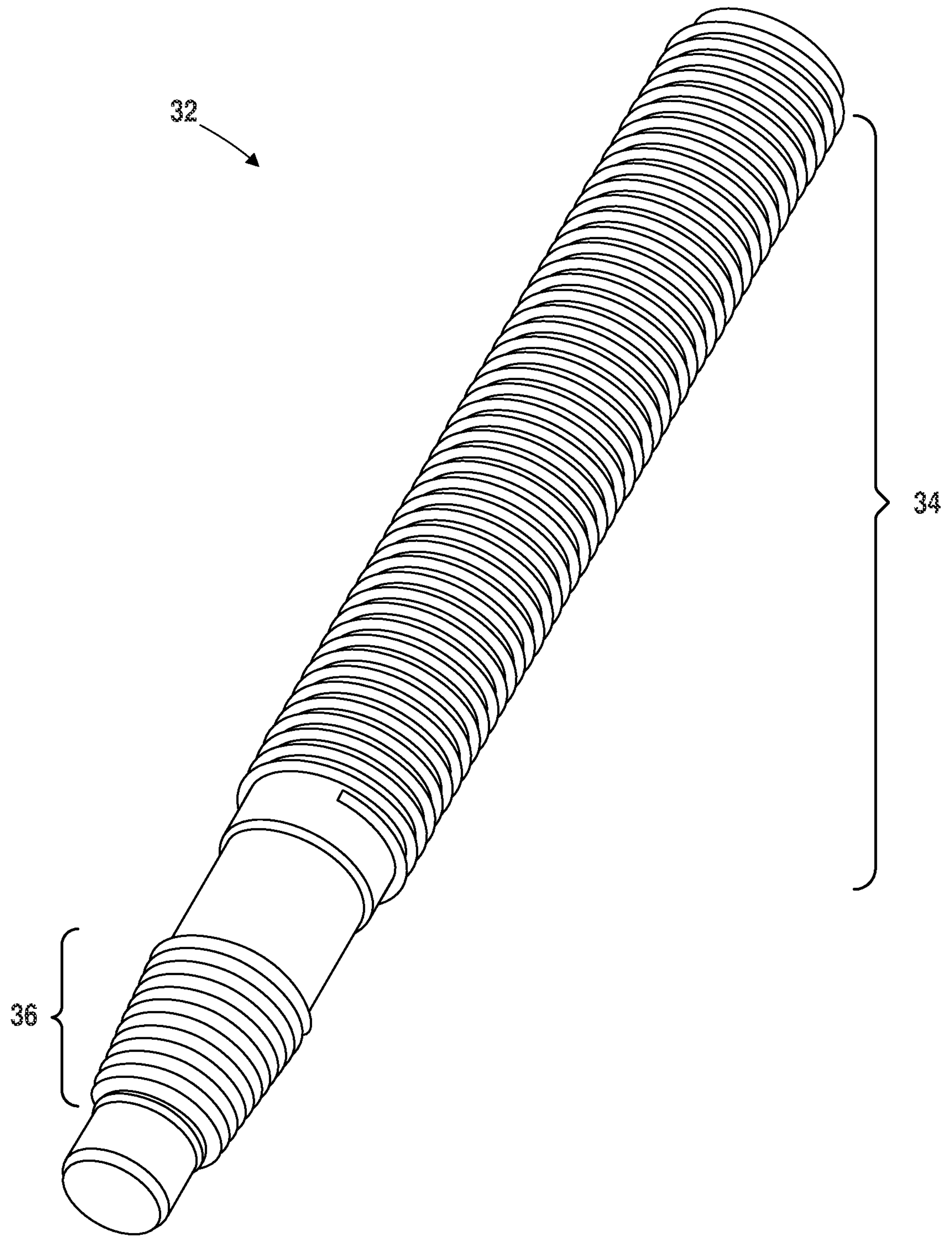
FIG. 14 is a perspective view of a threaded tapered rod of the present invention.
Figure 15:
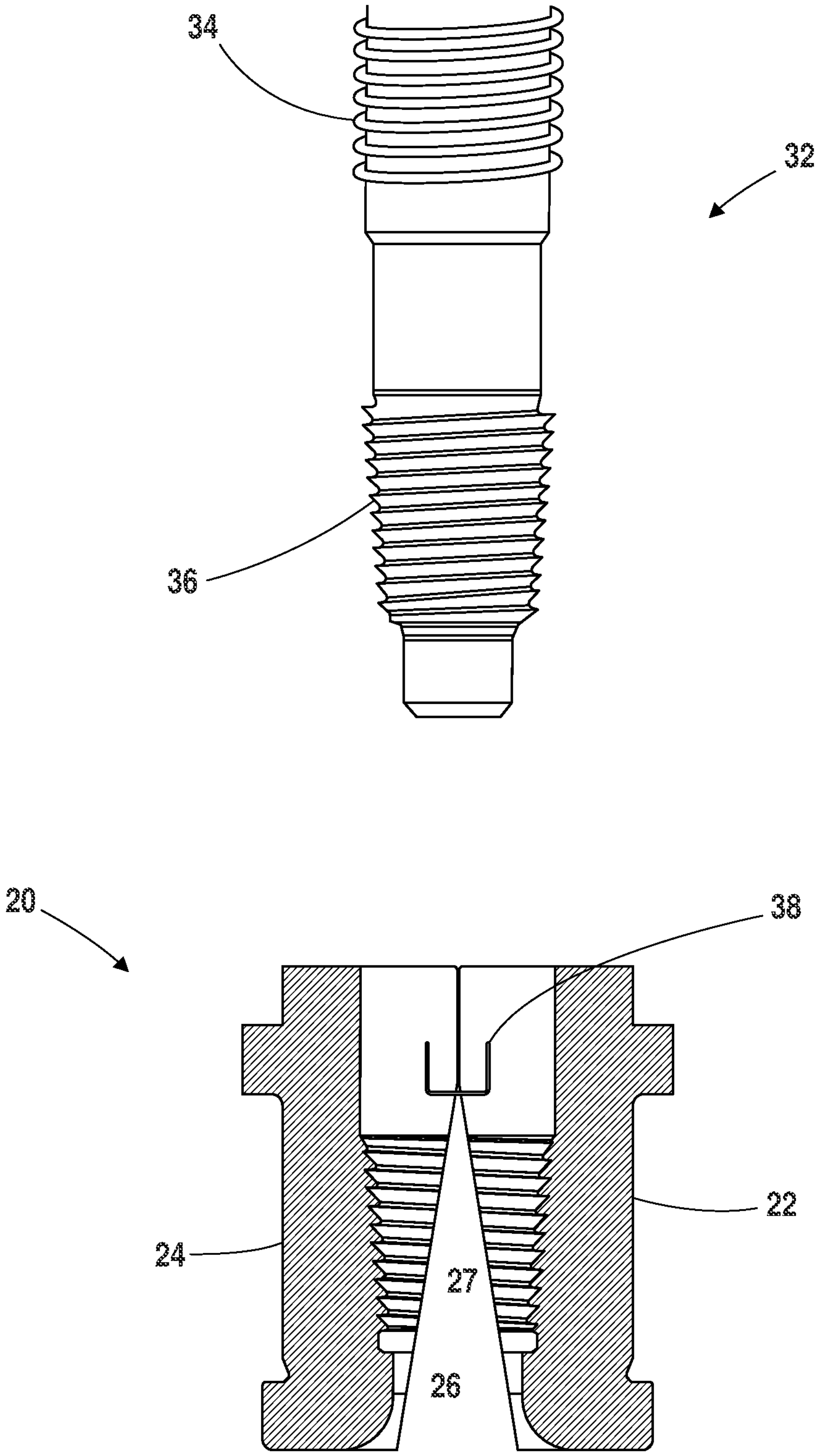
FIG. 15 depicts a front view of a threaded tapered rod and a cross-sectional view of an embodiment of the valve seat puller head of the present invention depicting the tapered threading within the valve seat puller head.
Figure 16:
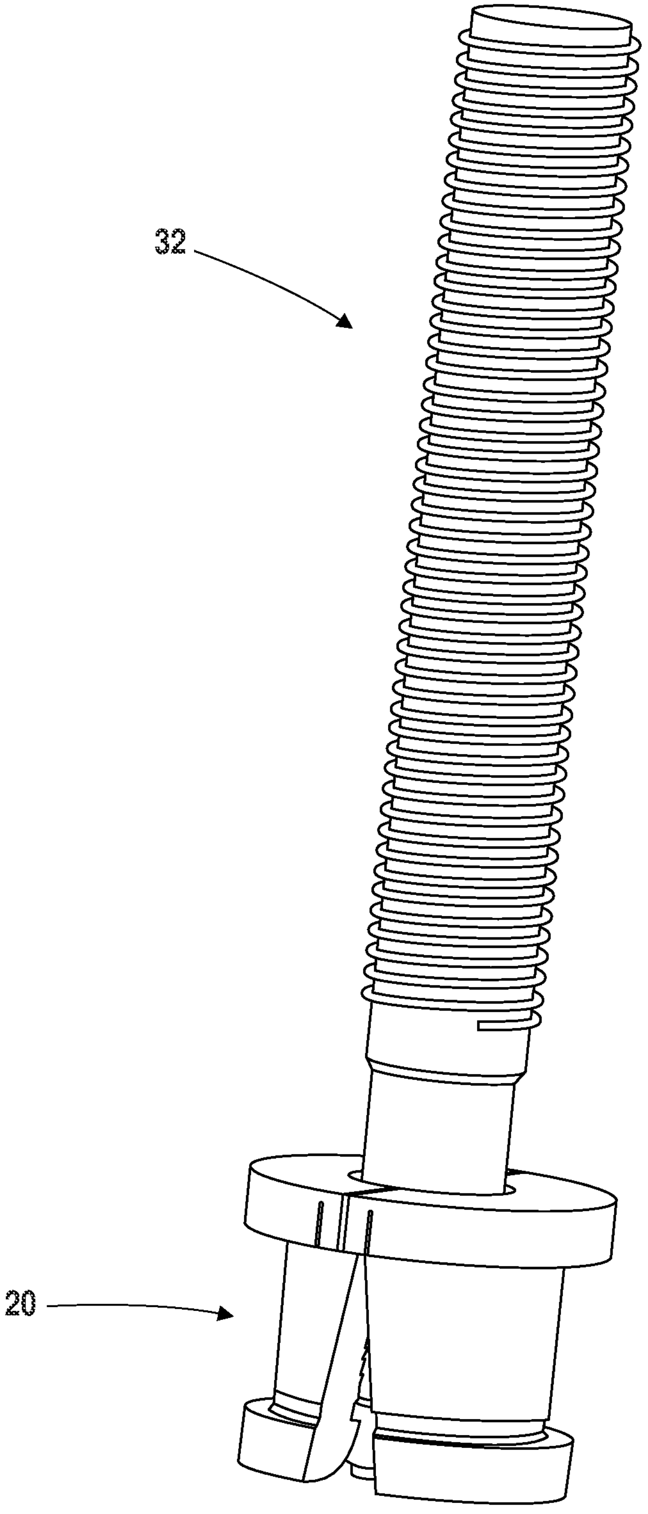
FIG. 16 depicts the valve seat puller head assembly including the threaded tapered rod engaged therein.

The next improvement of the present invention over the prior art is that a tapered buttress thread is used to engage valve seat puller head 20 with allthread 32, as shown in FIG. 14. The threaded rod shown in FIG. 14 is explained further. Referring now to FIG. 15, allthread 32 has threaded top end 34 and tapered threaded buttress bottom end 36. Threaded top end 34 has a uniformed threaded diameter. Tapered threaded buttress bottom end 36 is used only in the lower portion of allthread 32 that engages valve seat puller head 20 via opening 30, as shown in FIG. 15. Valve seat puller head 20 has compatible internal female threads 26 and 27 for receiving and are matable with male tapered threaded buttress bottom end 36, also as shown in FIG. 15. The valve seat puller head assembly of the present invention is comprised of valve seat puller head 20 and threaded tapered rod (allthread 32) engaged therein, as shown in FIG. 16.

Tapered threaded buttress bottom end 36 has advantages over the typical UNC thread used in most systems. The first advantage is the elimination of the thread clearance between the seat puller head and the allthread, as described above with reference to FIG. 1. As conventional systems apply the tension required to remove the mud pump valve seat, the thread clearance between the allthread 32 and valve seat puller head 20 allows seat puller head halves 22 and 24 to slide inward toward each other. The inward motion of seat puller head halves 22 and 24 then moves the contact point on the ear of valve seat puller head halves 22 and 24 in an outward direction. As the contact point moves outward, the bending moment is increased exponentially. Even a small outward change in the load point will dramatically reduce the fatigue life of valve seat puller head halves 22 and 24. Tapered threaded buttress bottom end 36 will push valve seat puller head halves 22 and 24 in the outward direction as allthread 32 is tightened into valve seat puller head halves 22 and 24. Tapered threaded buttress bottom end 36 effectively eliminates the thread clearance that allowed the inward slip of conventional seat puller heads, as discussed above. There is no movement in the seat puller components from clearances.

The next advantage of tapered threaded buttress bottom end 36 is that tapered threaded buttress bottom end 36 places more material in the load plane. This addresses the thread root initiation area failure experienced with the current technology. Conventional threads are symmetrical on both halves of the load area. A buttress thread places more material on the load area to reduce the shear pressure applied to the threads. Tapered threaded buttress bottom end 36 can only be used in load applications where the primary load is only applied in a primary direction. The tapered threaded buttress bottom end 36 will fail if loaded in the opposite direction. Valve seat puller heads 20 are only loaded in one direction. The tapered threaded buttress bottom end 36 greatly reduces the shear pressure at this root initiation area.

The tapered threaded buttress bottom end 36 of allthread 32 also allows for more "ear" material on valve seat puller head 20. Since allthread 32 will be smaller at the tip (i.e., insertion area), the inside diameter of valve seat puller head 20 at the ear will also be smaller. Since the outside diameter of valve seat puller head 20 is effectively the same at the inside of the valve seat, the thickness of the material at the ear area is increased. This further improves the fatigue life of the valve seat puller head of the present invention.

Most valve seat puller heads start with some clearance between the inside diameter of the valve seat and the outside diameter of the valve seat puller head. The valve seat puller head of the present invention reduces that clearance to zero resulting in a "fitted" puller. The fitted puller is necessary to implement the next design improvement.

Figure 17:
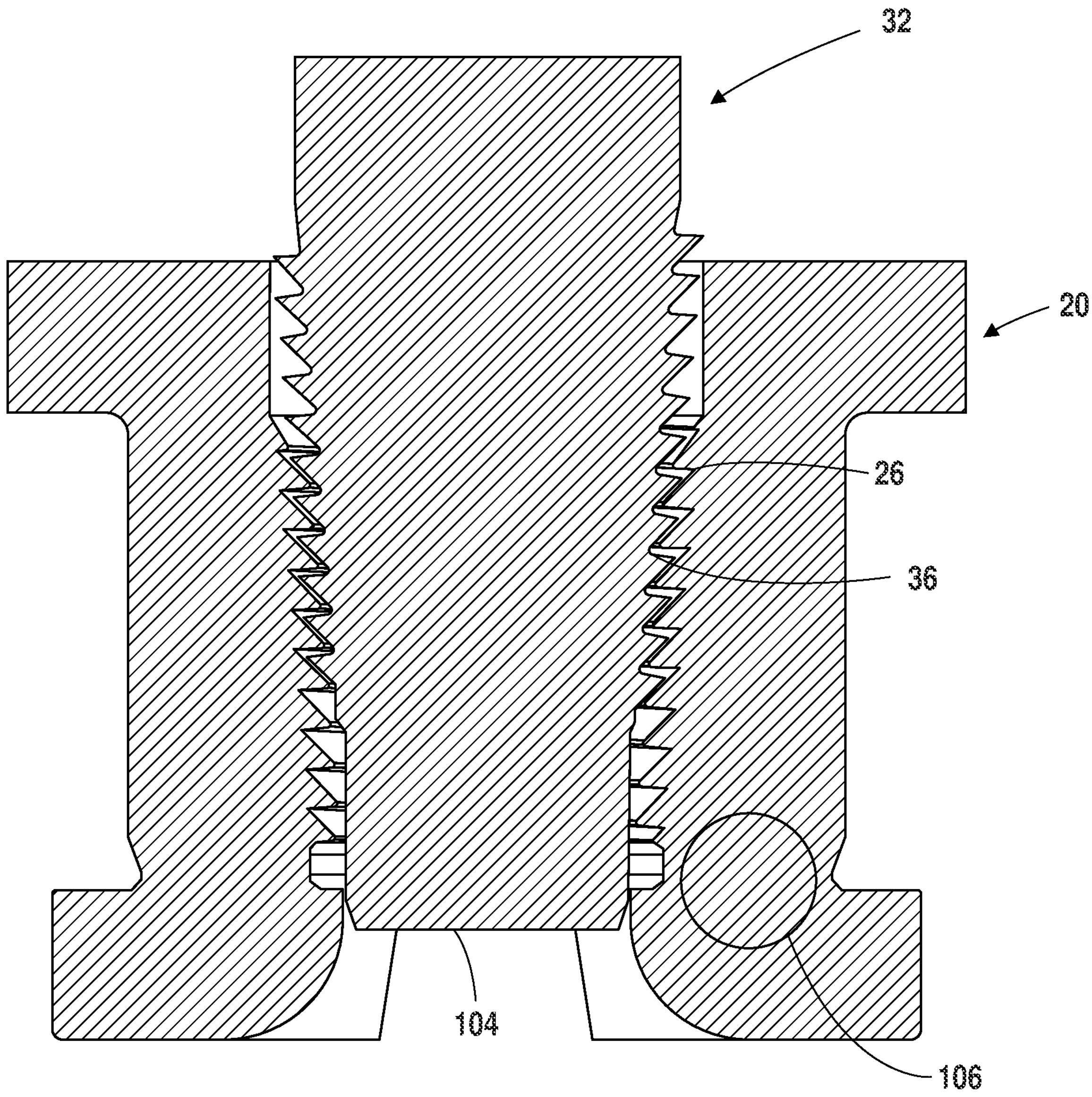
FIG. 17 shows a cross-sectional view of the initiation of threading of the threaded tapered rod into the valve seat puller head assembly of the present invention.

Referring now to FIG. 17, initiation of threading is discussed. All-thread 32 of the present invention is uniquely designed to valve seat puller head 20 of the present invention. As such, the dimension and configuration of the allthread of the present invention is critical. The tapered buttress thread does not exist on conventional seat pulling equipment. The valve seat puller head of the present invention, thus, will not work without this uniquely configured all-thread. If the user desires to purchase the valve seat puller head, the user would need to purchase the all-thread that matches the thread type (e.g., angle and pitch).

If the user were to try and replicate the allthread, the user would need to know the angle of taper and the thread pitch. Otherwise, the equipment will not work as designed. The present invention, therefore, includes a range of tapers and thread pitches. The range of the tapers is from 2 to 10 degrees, with a preferred taper of 5.5 degrees. The range of thread pitch is from 4 to 10 threads per inch (TPI), with a preferred thread pitch of 6 TPI.

Still referring to FIG. 17, another advantage of the present invention is that nose 104 of allthread 32 is of a geometry that prevents the initiation of the thread engagement (threads 36 with threads 26) if seat puller 20 is not fully inserted into the valve seat (not shown). Once valve seat puller head 20 is fully inserted and valve seat puller halves 22 and 24 extend outward to the fullest possible position, then nose 104 of allthread 32 will slip through the machined geometry of valve seat puller head 20 and allow threads 36 and 26 to engage, starting the tightening process.

Referring still to FIG. 17, as a further explanation of this, if there is an obstruction between the valve seat (not shown) and seat puller 20, the nose 104 of allthread 32 will not slide into valve seat puller head 20 because valve seat puller halves 22 and 24 will not fully extend outward. This is a safety mechanism which prevents allthread 32 and valve seat puller head 20 from engaging (threads) with one another if valve seat puller head 20 is not fully inserted into the valve seat (not shown).

The tapered configuration of allthread provides extra material at loaded area 106 of valve seat puller head 20. This extra material is approximately 0.72" radial thickness from the OD of nose 104 to OD of valve seat puller head 20 (as compared to 0.14" radial thickness for conventional seat pullers). Because the allthread has a tapered configuration, the present invention provides more area at loaded area 106, i.e., thicker area, to better resist external forces (e.g., forces applied from allthread upward against internal threading, force applied from valve seat downward on ear) than are conventional seat pullers which tend to display crack initiation and propagation at this area. The thickness of loaded area 106 of the present invention further prevents deflection and fatigue failures from occurring. The tapering also has the effect of having the forces not being concentrated at one area, but rather at different areas (e.g., the force applied from allthread is concentrated on an area elevated from the force applied from the valve seat).

Thread clearance refers to the amount of clearance between the outside geometry of a stud (e.g., allthread) and the inside geometry of a nut. There are different classes of threads, as defined by the American Standard B1.1-1949. These classes reduce or increase the thread clearance according to the specifications.

Persons having ordinary skill in the art, e.g., engineers, will use a tighter clearance if the application warrants a tighter fitting nut for a certain application. Too much clearance can have a negative effect as the nut and stud slip axially with respect to one another. In the case of conventional seat pullers, the thread clearance allows radial movement at the thread interface. The seat puller halves will essentially slide inward as a hydraulic force is applied to the stud (allthread).

Figure 18:
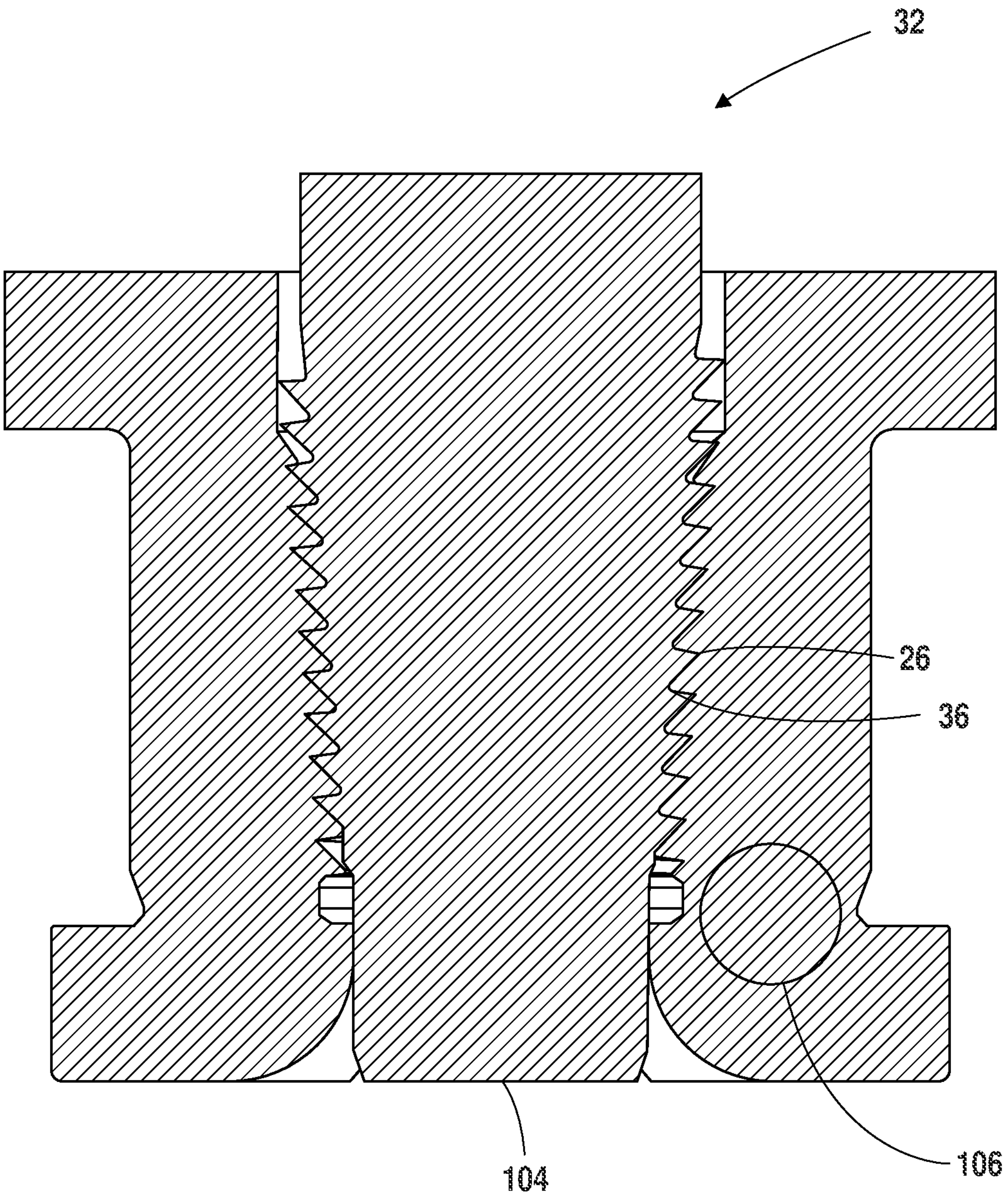
FIG. 18 shows a cross-sectional view of the full thread engagement of the threaded tapered rod fully inserted into the valve seat puller head assembly of the present invention.

Now referring to FIG. 18, the proper thread engagement and nose 104 of allthread 32 fully inserted into the nose area of seat puller is illustrated. The tapered buttress threads will tighten and reduce thread clearance. Nose 104 ensures proper function and positioning of valve seat puller head 20 into the valve seat (not shown). The allthreads can vary in total length from 1' to over 4.5'. Different length allthreads are used to "reach" the different depths of valve seats in the different pumps and still remain within the contemplation of the present invention.

Figure 19:
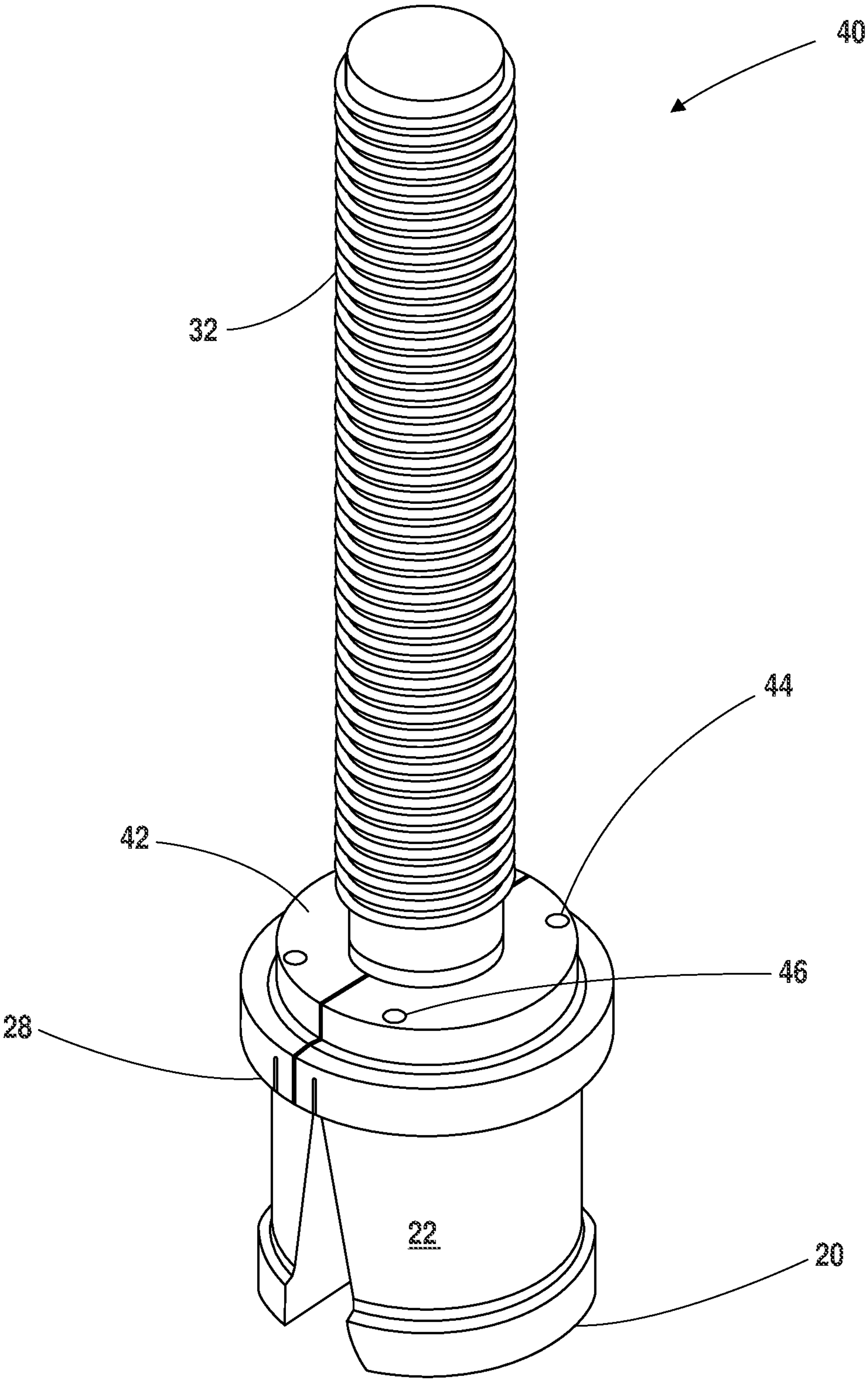
FIG. 19 is a perspective view of an embodiment of the present invention illustrating the detail of the valve seat puller head assembly having the threaded tapered rod engaged into the valve seat puller head with a cooling mechanism incorporated therein.

An additional advantage of the present invention is the incorporation of "cold pull" technology (in contrast to the "non-cold pull" version described with reference to FIG. 13, supra). Referring now to FIG. 19, the fitted design mentioned previously will be required as contact will be required between valve seat puller head and the valve seat. In this alternative embodiment, valve seat puller head assembly 40 is shown with allthread 32 fully engaged with valve seat puller head assembly 40 via opening 30. Allthread 32 measures 2" and is machined to accept tapered buttress thread or tapered threaded buttress bottom end 36. An extremely cold glycol solution is circulated via inlet 44 within annular ring 42 inside valve seat puller head 20 near its outside diameter through an annulus before exiting via outlet 46. The source of the extremely cold glycol solution is a conventional chiller available on the market. The extremely cold solution pulls and removes heat from valve seat puller head assembly 40. As valve seat puller head assembly 40 is in contact with the valve seat (not shown), heat is removed from the valve seat as well.

With a reduction of temperature of the valve seat, the complete geometry will reduce in size. The reduction in size is only slight, maybe only a few thousandths (0.003" to 0.007") in the total outside diameter. Nonetheless, this reduction in size significantly reduces the pulling force required to extract the valve seat. This is a very important point. If the pulling force is reduced, then the bending moment applied to the ear of valve seat puller head 20 is reduce. The stress applied to a thread root initiation area is also reduced. This increases the life of valve seat puller head 20 from the two main failures experienced with the current technology. This reduces maintenance cost as the present invention is anticipated to have double the life of the previous technology. In addition, less system failures minimizes exposure of maintenance personnel to the potential of projectile created by failing components.

Metal is a very good conductor of heat. While applying a cold fluid to a small component such as a valve seat can reduce the outside diameter of that valve seat, it is much more difficult to change a geometry of a much larger mass of metal. Therefore, the size of valve seat may be reduced due to the reduction in temperature, but the geometry of the much larger (300-350 times larger) mud pump case/housing is not impacted. Effectively, the present invention facilitates a small reduction in the valve seat geometry due to the reduction in temperature but does not affect the much more massive mud pump housing.

Figure 20:
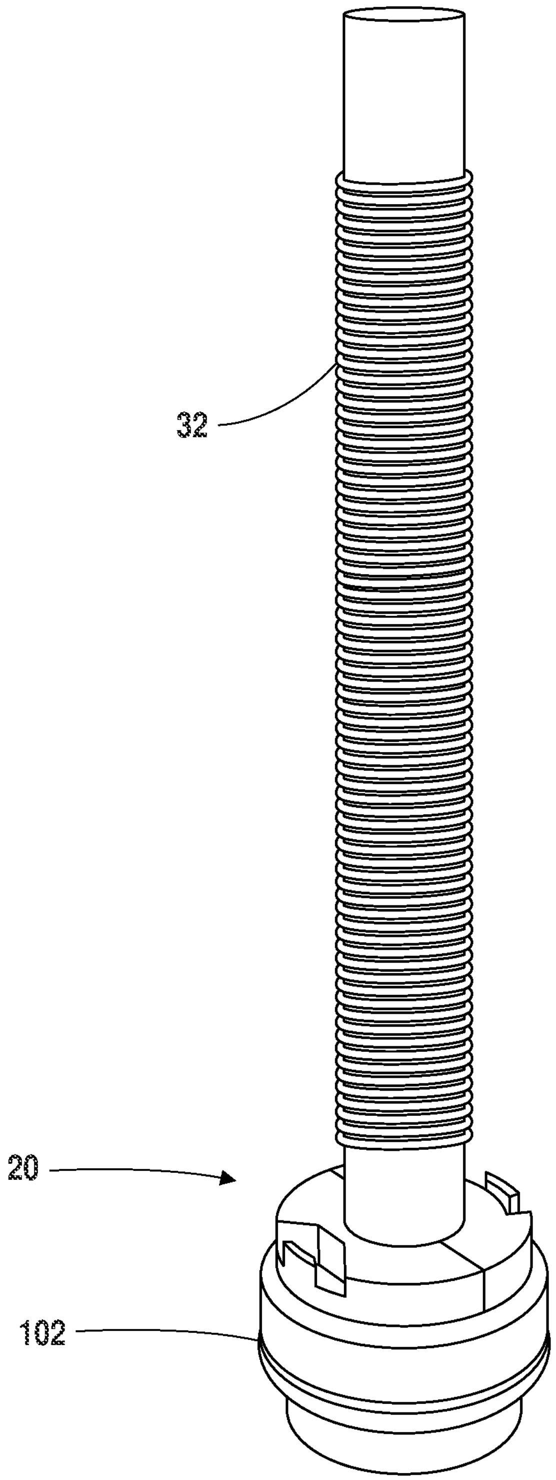
FIG. 20 shows a perspective view of the threaded tapered rod engaged into the valve seat puller head assembly and inserted into a valve seat.

Referring now to FIG. 20, allthread 32 is inserted within valve seat puller head 20, and valve seat puller head 20 is inserted within targeted valve seat 102. Of note is that there are many different seat variations from manufacturer to manufacturer. The dimensions will change for larger (or smaller) seats. The embodiment of the present invention discussed herein for this size is 5.5 lbs. in weight. However, other dimensions of a valve seat puller head assembly may be used and still remain within the contemplation of the present invention.

The present invention is comprised of steel, and more specifically of 4140 steel material. However, other robust materials or alloys may also be used and remain within the contemplation of the present invention. The present invention has application in the oil and gas industry.

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

I claim:

1. A valve seat puller head assembly comprising:

a housing comprised of two halves, each of said two halves having threading;

a plurality of springs removably attached to said two halves of said housing, said plurality of springs joining said two halves of said housing together in a cylindrical configuration, the joined said two halves of said housing defining an opening, said threading of said two halves forming a uniformed threaded interior surface of said two halves; and a threaded rod having a first end and a second end, said second end being tapered, wherein said tapered threaded end of said threaded rod is mateable with said uniformed threaded interior surface of said two halves of said housing.

2. The valve seat puller head assembly, as recited in claim 1 further comprising a slot on an undersurface of a top exterior surface of each of said two halves.

3. The valve seat puller head assembly, as recited in claim 2 further comprising a locking tab within each of said plurality of springs, said locking tab matable with corresponding said slot.

4. The valve seat puller head assembly, as recited in claim 3 further comprising at least one protrusion extending distally from an outside surface of said valve seat puller head at a point of engagement between said valve seat puller head and a valve seat.

5. The valve seat puller head assembly, as recited in claim 4 wherein said at least one protrusion is a pin.

6. The valve seat puller head assembly, as recited in claim 4 wherein said at least one pin is knurled.

7. The valve seat puller head assembly, as recited in claim 4 wherein said at least one pin is an impingement.

8. The valve seat puller head assembly, as recited in claim 4 further comprising:

an annular ring within said valve seat puller head assembly, and a solution circulating within said annular ring.

9. The valve seat puller head assembly, as recited in claim 8 wherein said solution is glycol solution.

10. The valve seat puller head assembly, as recited in claim 9 wherein said glycol solution is maintained at a temperature range of 0° C. to −10° C.

* * * * *